United States Patent [19]

Irvin

[11] Patent Number: 5,590,592
[45] Date of Patent: Jan. 7, 1997

[54] DEVICE FOR BANDING BRANCHES OF A PALM TREE

[76] Inventor: Gary Z. Irvin, 8665 Erie La., Parrish, Fla. 34219

[21] Appl. No.: 572,699

[22] Filed: Dec. 14, 1995

[51] Int. Cl.⁶ .................................................... B65B 13/00
[52] U.S. Cl. .................. 100/1; 47/1.01; 53/390; 53/530; 53/585; 100/9; 100/233
[58] Field of Search ............................ 100/1, 9, 41, 212, 100/233, 236, 296; 47/1.01, 1 M, 1 B; 53/390, 530, 585

[56] References Cited

U.S. PATENT DOCUMENTS

| | | | |
|---|---|---|---|
| 221,972 | 11/1879 | Murray et al. | 47/1.01 |
| 572,133 | 12/1896 | Stephens | 47/23 |
| 1,211,745 | 1/1917 | Nielsen | 100/233 |
| 1,222,856 | 4/1917 | England | 100/233 |
| 1,877,548 | 9/1932 | Brimer | 100/233 |
| 2,534,595 | 12/1950 | Hamilton | 47/1 B |
| 3,001,345 | 9/1961 | Zeller . | |
| 3,104,609 | 9/1963 | Crawford | 53/390 |
| 3,358,418 | 12/1967 | Manetta | 53/530 |
| 3,455,084 | 7/1969 | Broersma | 100/232 |
| 3,460,363 | 8/1969 | Grantham | 100/212 |
| 3,662,490 | 5/1972 | Childs | 53/390 |
| 3,747,293 | 7/1973 | VanSlooten et al. | 47/1 M |
| 4,939,989 | 7/1990 | Zacharias | 100/13 |

FOREIGN PATENT DOCUMENTS

| | | | |
|---|---|---|---|
| 0332730 | 9/1989 | European Pat. Off. | 47/1 B |
| 72979 | 8/1916 | Switzerland | 100/1 |
| 1197786 | 7/1970 | United Kingdom | 53/530 |

*Primary Examiner*—Stephen F. Gerrity
*Attorney, Agent, or Firm*—Charles J. Prescott

[57] ABSTRACT

A device for temporarily compressing or bending branches of a palm tree into a gathered position wherein the branches extend lengthwise upwardly from the trunk of the palm tree and for holding the branches in the gathered position during relocation and planting of the palm tree. The device has several embodiments, all of which include handles for grasping and forcibly urging the trunk encircling member, when closed around the trunk just below the branches, upwardly to inwardly deflect and temporarily hold the branches in the gathered configuration.

12 Claims, 4 Drawing Sheets

DEVICE FOR BANDING BRANCHES OF A PALM TREE

BACKGROUND OF THE INVENTION

1. Scope of Invention

This invention relates generally to the transplanting of trees, and more particularly to the temporary compacting of branches of a palm trees during relocation and transplanting.

2. Prior Art

Trees generally referred to as palm trees have strong, relatively stiff branches which extend diagonally upwardly and outwardly from the upper portion of the trunk of the palm tree. Although these branches are quite strong and have sharp prominences laterally extending from the length of each branch which may inflict wounds into the hands of a worker manually handling and manipulating the palm tree, nonetheless the branches are bendable upwardly without damaging them.

It is well known to manually bend the branches of the palm tree upwardly into a compacted position wherein they extend generally lengthwise upwardly from the trunk, thus substantially reducing the overall diameter of the palm tree during its uprooting, transporting and replanting such as from a nursery setting into an end-user's yard or grounds area.

To maintain the bent or inwardly deflected branches in that position temporarily during transplanting, a length of twine or the like is typically wrapped around the branches after they have been so bent manually. This is a difficult procedure at best when done by hand, easily leading to the branches inflicting wounds into the face, hands and upper torso of the worker during this procedure.

One apparatus somewhat similar to that of the present invention is disclosed in U.S. Pat. No. 3,747,293 invented by VanSlooten, et al. which teaches a reusable split ring openable and positionable around the base of a live shrub or tree. A reusable flexible tubular wrap is secured to the ring and downwardly extends therefrom as the ring is hoisted upwardly by pulley so as to position the wrap around the slightly compacted branches of the shrub or tree. Thereafter, one of a plurality of stored packaging sleeves are pulled downwardly from a dispenser and over the wrapped shrub, after which the wrap is pulled upwardly by the split ring and removed for reuse.

Other patented devices and apparatus even more dissimilar with respect to the present invention are disclosed in the following U.S. patents.

| | |
|---|---|
| 221,972 | Murray |
| 572,133 | Stephens |
| 3,001,345 | Zeller |
| 3,380,220 | Jennings, et al. |
| 3,455,084 | Broersma, et al. |
| 3,662,490 | Childs |
| 4,939,989 | Zacharias |

The present invention provides a split ring positionable around the trunk of a palm tree immediately below the lowest branches of the palm tree. Opposing handles are then manually gripable to forcibly urge the closed split ring upwardly against the branches, bending and deflecting them into a generally compacted lengthwise orientation upwardly extending from the palm tree trunk. The split ring is then left in this position during uprooting, transporting and replanting of the palm tree, after which it is removed for reuse. No other devices are required for this procedure utilizing the present invention.

BRIEF SUMMARY OF THE INVENTION

This invention is directed to a device for temporarily compressing or bending branches of a palm tree into a gathered position wherein the branches extend lengthwise upwardly from the trunk of the palm tree and for holding the branches in the gathered position during relocation and planting of the palm tree. The device has several embodiments, all of which include handle means for grasping and forcibly urging the trunk encircling member, when closed around the trunk just below the branches, upwardly to inwardly deflect and temporarily hold the branches in the gathered configuration.

It is therefore an object of this invention to provide a device for temporarily compacting the branches of a palm tree and securing the branches in a lengthwise position with the palm tree trunk during transplanting of the palm tree.

It is yet another object of this invention to more easily and effectively compress the branches of a palm tree into a lengthwise orientation with respect to the palm tree.

It is still another object of this invention to provide a reusable split ring for compressing and holding the branches of a palm tree into a compacted lengthwise orientation for handling ease and protection for the branches during transplanting of the palm tree.

In accordance with these and other objects which will become apparent hereinafter, the instant invention will now be described with reference to the accompanying drawings.

DETAILED DESCRIPTION OF THE INVENTION

Figure 1:
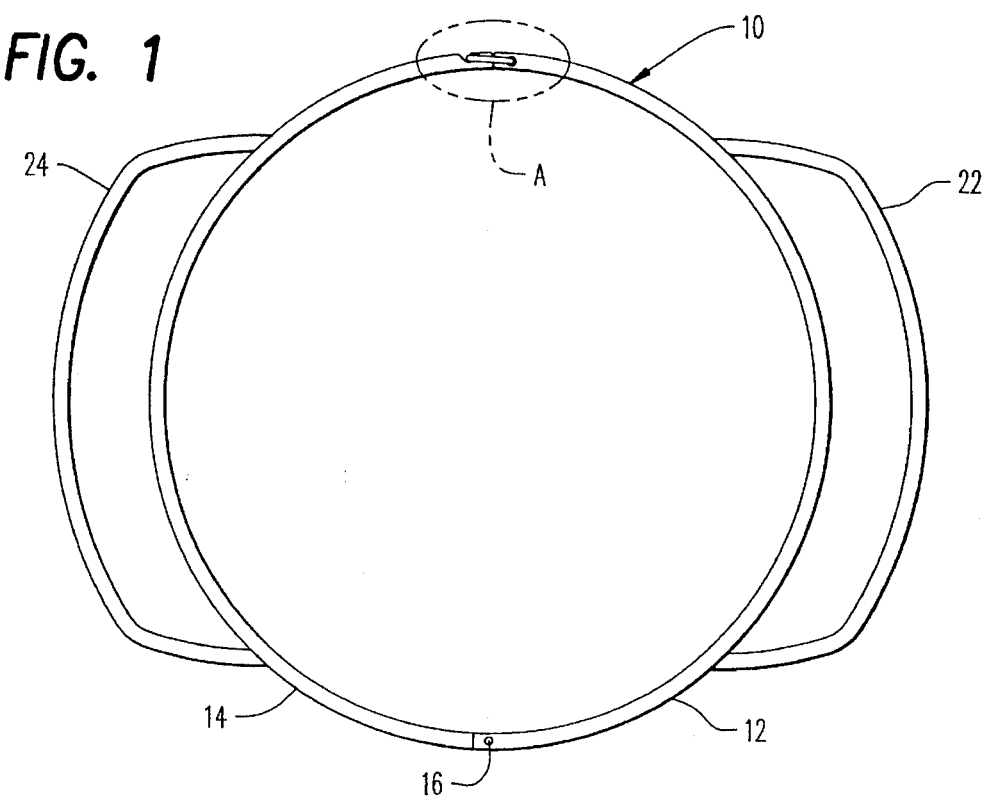
FIG. 1 is a plan view of the preferred embodiment 10 of the invention in a closed position.
Figure 2:
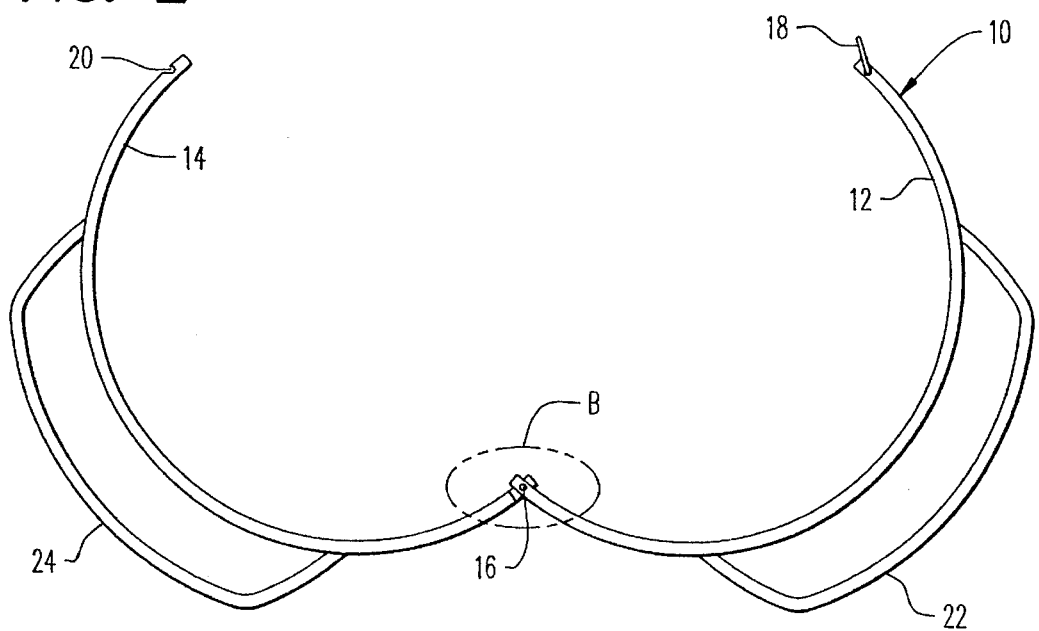
FIG. 2 is a plan view of the invention shown in FIG. 1 in an open position.
Figure 3:
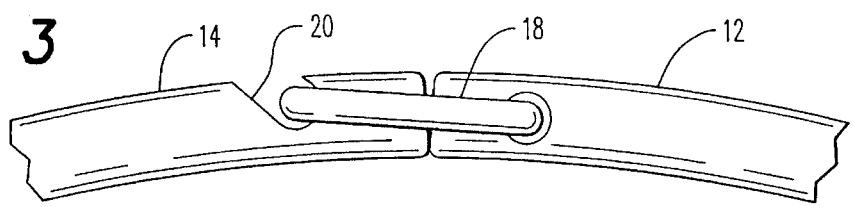
FIG. 3 is an enlarged view of area A of FIG. 1.
Figure 4:
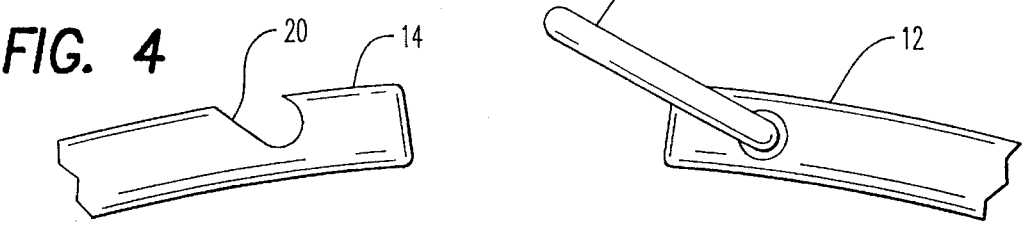
FIG. 4 is a view similar to FIG. 3 except that the mating ends of each split ring are the latch holding them together are disengaged one from another.
Figure 5:
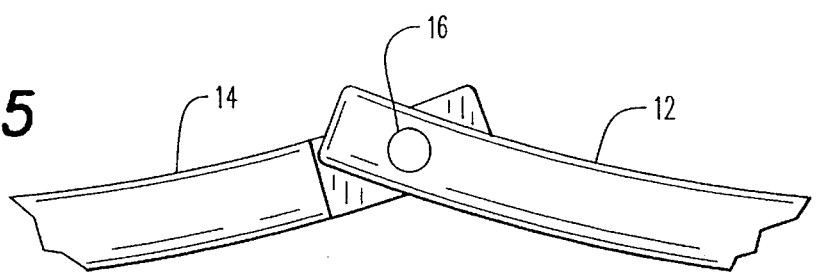
FIG. 5 is an enlarged view of area B of FIG. 2.

Referring now to the drawings, and particularly to FIGS. 1, to 5, the preferred embodiment of the invention is shown generally at numeral 10 and includes two split rings 12 and 14 made of rigid solid steel rods each formed into the same semi-circular shape shown. The ring halves 12 and 14 are pivotally connected at 16 and are thus movable from the closed position shown in FIG. 1 to an open position shown in FIG. 2. To maintain the closed position, a wire latch 18 pivotally connected to the free end of ring half 12 mateably engages into an angled slot 20 formed adjacent the free end of ring half 14 as best seen in FIGS. 3 and 4.

Opposing handles 22 and 24, outwardly extending from each ring half 12 and 14, respectively, are also formed of rigid steel solid rod stock and are sized for manual grasping of the device 10 during its use.

Figure 11:
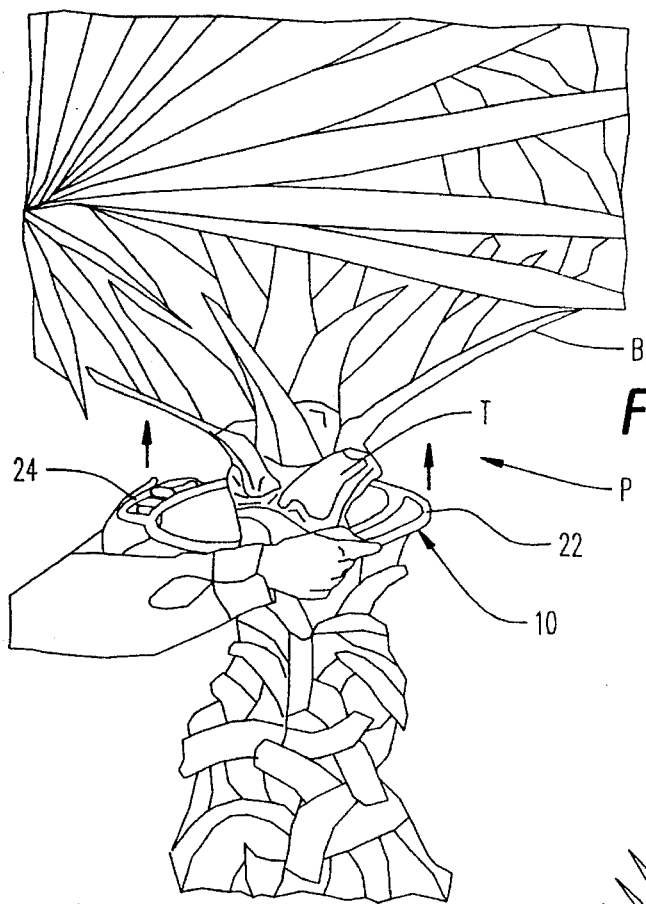
FIG. 11 is a perspective view of the invention 10 shown in FIGS. 1 and 2 in a closed position around the upper end of the palm tree trunk.
Figure 12:
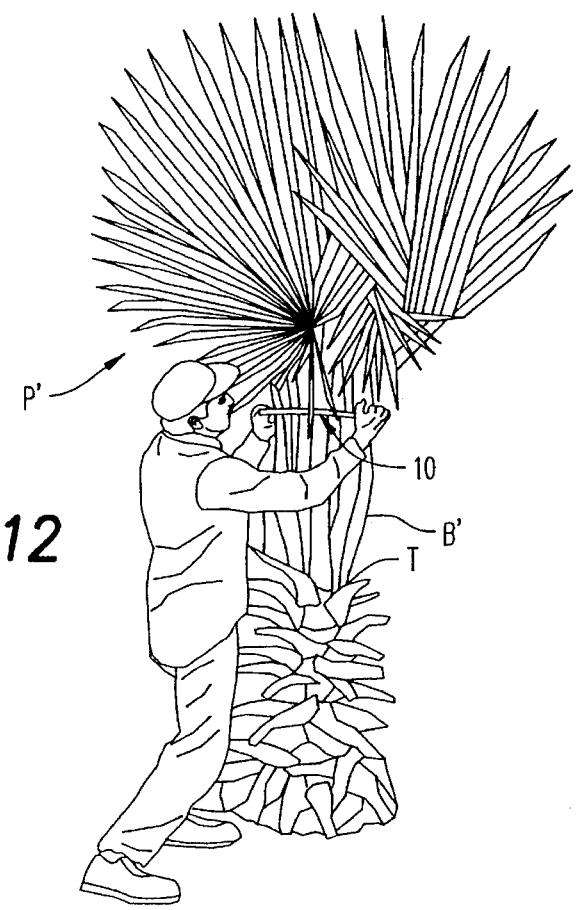
FIG. 12 is a perspective view similar to FIG. 11 after the device 10 has been upwardly urged manually to compress the palm tree branches.

As seen in FIGS. 11 and 12, the device 10 is positionable around the upper end of a trunk T of the palm tree P immediately below the normally outwardly extended branches B. After the latch 18 is secured in a closed position as shown in FIG. 3, the opposing handles 22 and 24 are manually grasped and the closed device 10 is forcibly urged upward in the direction of the arrows in FIG. 11. The branches B are bendably urged together into a lengthwise bundle as shown in FIG. 12. In this configuration, the branches B' in FIG. 12 of the palm tree P' are substantially smaller in overall diameter and circumference, during which configuration the device 10 would be left in the position shown in FIG. 12 for transplanting of the palm tree as desired. By substantially compacting the branches B', they are also much less vulnerable to damage.

By the arrangement of opposing handles 22 and 24 of device 10, the hands of the worker are kept away from the hurtful edges of the branches B as the device 10 is forcibly urged upward to resiliently compact the branches. Again, the device 10 may either be left in the position shown in FIG. 12, or alternately, a length of wrapping material shown in FIG. 12 being held by the worker may be wrapped around the bent and compacted branches B', thus allowing the device 10 to be removed before transplanting of the palm tree P'.

Figure 6:
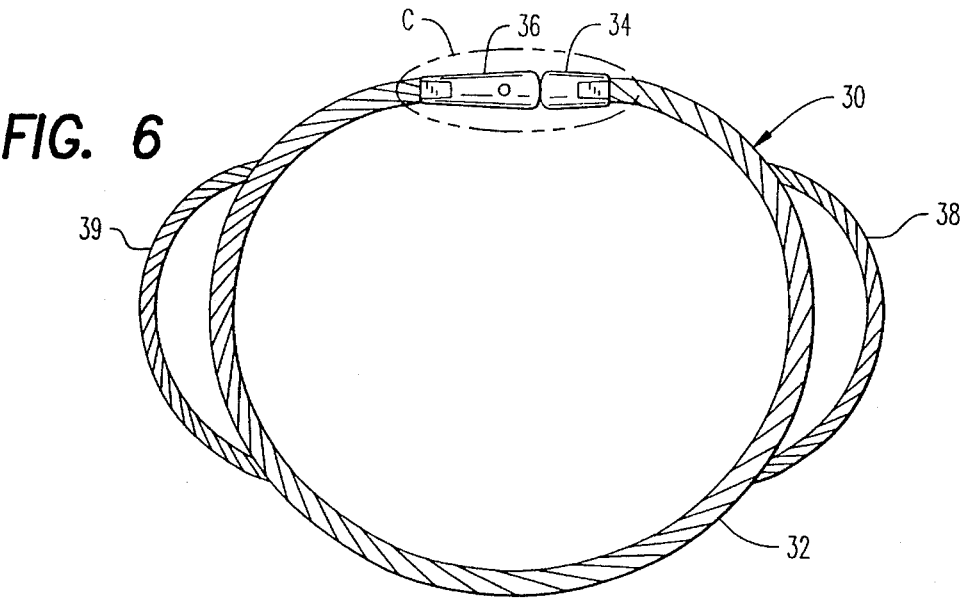
FIG. 6 is a plan view of another embodiment 30 of the invention.
Figure 7:
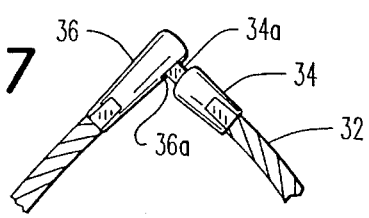
FIG. 7 is a view of area C of FIG. 6 showing the mating engaged ends of the flexible cable ring 32 in the process of being disengaged one from another.

Referring now to FIGS. 6 and 7, another embodiment of the invention is there shown at numeral 30, the ring 32 fabricated of a single length of semi-flexible steel cable. Interengaging members 34 and 36 secured at each end of the cable 32 and of a well-known interengagement structure as seen in FIG. 7 facilitate the opening and closing of the device 30 in a sequence previously described around the upper end of the trunk T of the palm tree P. Shaft 34a of interengaging member 34 includes a spherical enlarged distal end (not shown) which lockingly engages into a formed slot 36a of locking member 36. The device 30 also includes opposing handles 38 and 39 fabricated of semi-flexible steel cable material.

Figure 8:
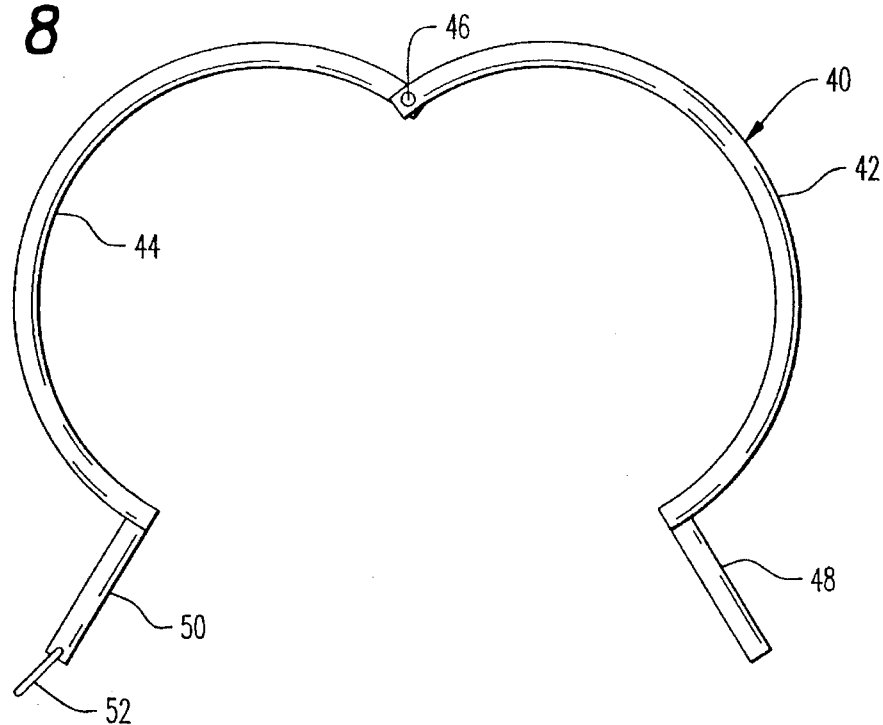
FIG. 8 is a plan view of yet another embodiment 40 of the invention in an open position.

Still another embodiment of the invention is shown in FIG. 8 generally at numeral 40 and includes two rigid split ring halves 42 and 44 formed of rigid rod stock, pivotally connected end to end at 46 so that the ring halves 42 and 44 may be pivotally moved between the open position shown and a closed configuration (not shown) wherein handles 48 and 50 are positioned adjacent one another and latch member 52 secures this closed arrangement.

Figure 9:
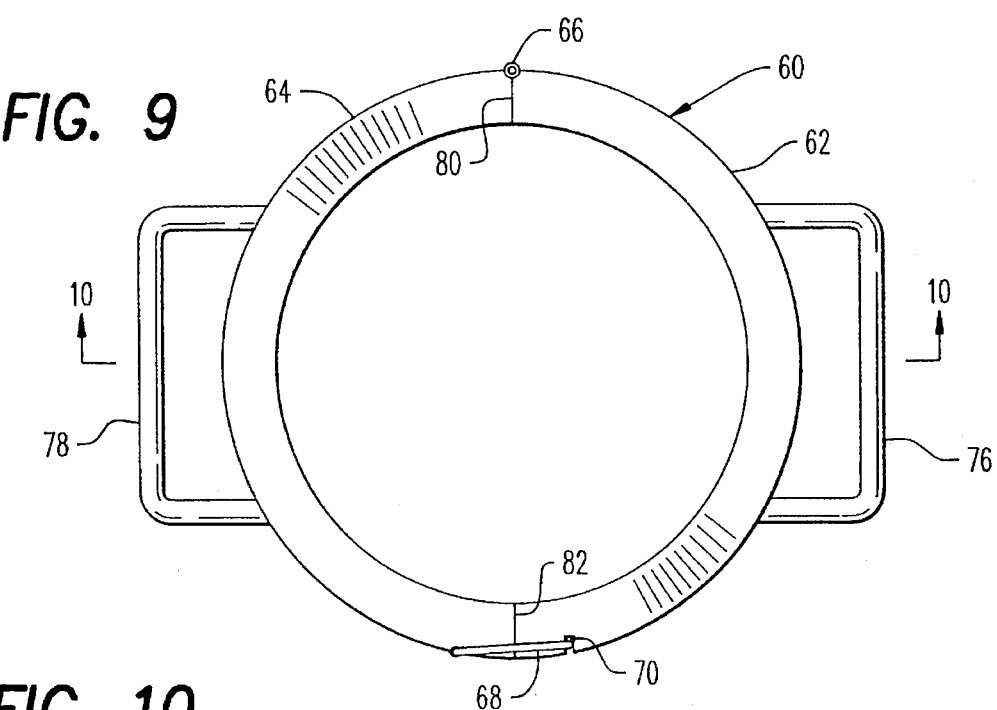
FIG. 9 is a plan view of still another embodiment 60 of the invention in a closed position.
Figure 10:
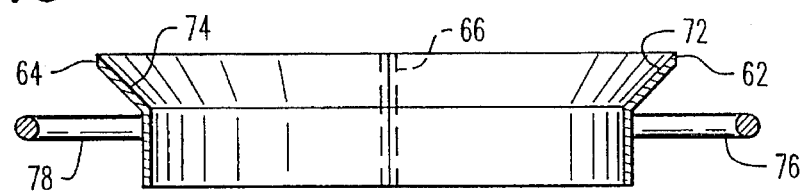
FIG. 10 is a section view in the direction of arrows 10—10 in FIG. 9.

Still another embodiment of the invention is shown generally at 60 in FIGS. 9 and 10. This embodiment 60 includes two split ring halves 62 and 64 formed of rigid material pivotally connected at 66. When the device 10 is in a closed configuration shown in FIG. 9 and secured in that position by latch 68 acting in slot 70, the ring halves 62 and 64 abutting one another at 80 and 82, define a continuous circular cylindrical lower portion 84 and a generally conical upper portion 86. Opposing lifting handles 76 and 78 are formed of rigid steel rod as shown.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A device for temporarily inwardly compressing and banding branches of a palm tree comprising:

a split ring sized in circumference to be fitted around a trunk of the palm tree just below the branches;

means for securing said ring in a closed position when so fitted around the trunk;

handle means connected and extending outwardly from said ring for grasping and manually forcibly urging said ring, when closed, upwardly to resiliently bend and gather the branches together in a bundle generally lengthwise to the trunk wherein the branches are temporarily secured by said ring during relocation of the palm tree.

2. A device for banding branches of a palm tree as set forth in claim 1, wherein:

said split ring is formed of two generally semi-circular thin rigid members pivotally connected end to end.

3. A device for banding branches of a palm tree as set forth in claim 2, wherein:

said split ring includes a conically shaped outwardly extending flange for smooth engagement against the branches as said device is upwardly urged.

4. A device for banding branches of a palm tree as set forth in claim 1, wherein:

said split ring and said handle means are each formed from a single length of somewhat flexible cable.

5. A device for temporarily inwardly bending and holding branches of a palm tree during transporting and planting of the palm tree comprising:

means defining an openable ring when in a closed position sized for closely encircling a trunk of a palm tree just below the branches;

means for opening said ring defining means for trunk encircling positioning and means for securing said ring defining means in a closed position thereafter;

handle means connected and outwardly extending in opposing directions from said ring defining means for hand grasping and forcibly urging said ring defining means upwardly from the trunk to resiliently bend and gather the branches together in a bundle wherein the branches are temporarily secured in a compacted bundle generally lengthwise to the trunk during transporting and planting of the palm tree.

6. A device for banding branches of a palm tree as set forth in claim 5, wherein:

said ring defining means is a split ring formed of two generally semi-circular, thin rigid members of uniform circular cross section pivotally connected end to end.

7. A device for banding branches of a palm tree as set forth in claim 6, wherein:

said split ring includes a conically shaped outwardly extending flange for smooth engagement against the branches as said device is upwardly urged.

8. A device for banding branches of a palm tree as set forth in claim 5, wherein:

said ring defining means is formed from a single length of somewhat flexible cable.

9. A device for temporarily bending otherwise outwardly extending branches of a palm tree into a gathered position extending generally lengthwise to a trunk of the palm tree consisting of:

a split ring sized in circumference to be fitted around a trunk of the palm tree just below the branches;

means for securing said ring in a closed position when fitted around the trunk;

handle means connected and extending outwardly from said ring for grasping and manually forcibly urging said ring, when closed, upwardly to resiliently bend and gather the branches together in a bundle generally lengthwise to the trunk wherein the branches are temporarily secured by said ring during relocation of the palm tree.

10. A device for banding branches of a palm tree as set forth in claim 9, wherein:

said split ring is formed of two generally semi-circular thin rigid members pivotally connected end to end.

11. A device for banding branches of a palm tree as set forth in claim 10, wherein:

said split ring includes a conically shaped outwardly extending flange for smooth engagement against the branches as said device is upwardly urged.

12. A device for banding branches of a palm tree as set forth in claim 9, wherein:

said split ring and said handle means are each formed from a single length of somewhat flexible cable.

* * * * *